(12) United States Patent
Zeng

(10) Patent No.: US 11,283,282 B2
(45) Date of Patent: Mar. 22, 2022

(54) MULTI-FUNCTIONAL SMART WIRELESS CHARGING DEVICE FOR CELL PHONE IN HORIZONTAL PLACEMENT AND VERTICAL PLACEMENT

(71) Applicant: SHENZHEN DBK ELECTRONICS CO., LTD., Guangdong (CN)

(72) Inventor: Jinhui Zeng, Guangdong (CN)

(73) Assignee: SHENZHEN DBK ELECTRONICS CO., LTD.

( * ) Notice: Subject to any disclaimer, the term of this patent is extended or adjusted under 35 U.S.C. 154(b) by 21 days.

(21) Appl. No.: 16/908,753

(22) Filed: Jun. 23, 2020

(65) Prior Publication Data

US 2021/0119470 A1 Apr. 22, 2021

Related U.S. Application Data

(63) Continuation of application No. PCT/CN2019/126036, filed on Dec. 17, 2019.

(30) Foreign Application Priority Data

Oct. 18, 2019 (CN) .......................... 201921750520.9

(51) Int. Cl.
- *H01M 10/46* (2006.01)
- *H02J 7/02* (2016.01)
- *H02J 50/10* (2016.01)
- *H02J 7/00* (2006.01)

(52) U.S. Cl.
CPC .............. *H02J 7/02* (2013.01); *H02J 7/0029* (2013.01); *H02J 7/0045* (2013.01); *H02J 7/0047* (2013.01); *H02J 50/10* (2016.02)

(58) Field of Classification Search
CPC ...... H02J 7/0029; H02J 7/0045; H02J 7/0044; H02J 50/005; H02J 50/10; H02J 7/0047
USPC ................................ 320/107, 108, 114, 115
See application file for complete search history.

(56) References Cited

U.S. PATENT DOCUMENTS

| 2011/0115433 A1 | 5/2011 | Lee et al. |
| 2019/0115781 A1* | 4/2019 | Feng ...................... H02J 7/0044 |
| 2020/0057469 A1* | 2/2020 | Choi ....................... G06F 1/203 |

(Continued)

FOREIGN PATENT DOCUMENTS

| CN | 104917219 A | 9/2015 |
| CN | 205178579 U | 4/2016 |
| CN | 108418286 A | 8/2018 |

(Continued)

*Primary Examiner* — Edward Tso

(57) ABSTRACT

Disclosed is multi-functional smart wireless charging device for cell phone in horizontal placement and vertical placement, including a hollow main body rear shell. A protection assembly is fixedly provided in the main body rear shell. A main PCB is provided on top of the protection assembly. One side of the PCB being abutted against a wireless charging PCB fixedly provided on top of the protection assembly. The wireless charging PCB is connected with a main body front shell on one side of the wireless charging PCB remote from the main PCB. A wireless charging bottom shell is slidably connected with the main body front shell at its one side remote from the main body rear shell. One side of the wireless charging bottom shell is provided with a wireless charging front shell. The device may also charging by wire when wireless charging is not carried out.

20 Claims, 5 Drawing Sheets

(56) References Cited

U.S. PATENT DOCUMENTS

2021/0050743 A1* 2/2021 Min .................. H02J 7/0044

FOREIGN PATENT DOCUMENTS

| CN | 208078686 U | 11/2018 | | |
|---|---|---|---|---|
| CN | 208623344 U | 3/2019 | | |
| WO | WO-2020055560 A1 * | 3/2020 | .............. | H04M 1/04 |

* cited by examiner

MULTI-FUNCTIONAL SMART WIRELESS CHARGING DEVICE FOR CELL PHONE IN HORIZONTAL PLACEMENT AND VERTICAL PLACEMENT

CROSS REFERENCE

The present disclosure is a Continuation Application of the International application No. PCT/CN2019/126036, filed Dec. 17, 2019, which claims priority to Chinese patent application No. 201921750520.9, entitled "Multi-functional smart wireless charging device for cell phone in horizontal placement and vertical placement", filed Oct. 18, 2019, the entire contents of which are hereby incorporated by reference.

TECHNICAL FIELD

The present disclosure relates to the field of wireless charging for mobile phones, in particular to a multi-functional smart wireless charging device for cell phone in horizontal placement and vertical placement.

BACKGROUND

Wireless charging technology originates from wireless power transmission, and can be subdivided into low-power wireless charging and high-power wireless charging. The Low-power wireless charging is usually by electromagnetic induction, such as Qi mode for mobile phone charging. But wireless charging for electric vehicle of ZTE is by induction. The high-power wireless charging is typically by resonance, which transmits energy from power supply equipment to power consumption. The power supply equipment takes the received energy for charging the battery and for simultaneously sustaining its own operation. Since the charger and the electric device to be charged transmit energy by magnetic field, rather than connected by wires, both the charger and the electric device can be exposed without conductive contacts.

The present disclosure aims to improve the related art. In the related art, most of the wireless charging products for mobile phones in the market have to place the mobile phone on the product in one fixed (one of horizontal or vertical) way for charging. When users would like to operate the mobile phone during the charging process, the fixed placement may bother the user and bring inconvenience. The practicability of the wireless charging product is relatively low.

SUMMARY

The present disclosure aims to solve the defects in the prior art, and provides a multi-functional smart wireless charging device that allows a cell phone in both manners of horizontal placement and vertical placement.

In order to achieve the above objective, the present disclosure has the following technical solutions:

a multi-functional smart wireless charging device for cell phone in horizontal placement and vertical placement, comprising a hollow main body rear shell, wherein a protection assembly is fixedly provided in the main body rear shell; a main PCB is provided on top of the protection assembly, one side of the PCB being abutted with a wireless charging PCB fixedly provided on top of the protection assembly, wherein the wireless charging PCB 8 is connected with a main body front shell on one side of the wireless charging PCB remote from the main PCB; the main body front shell and the main body rear shell are fixedly provided by bolts; a wireless charging bottom shell is slidably connected on one side of the main body front shell remote from the main body rear shell; and a wireless charging front shell is installed on one side of the wireless charging bottom shell remote from the main body front shell.

As a further description of the above technical solution, a placing plate is fixedly provided at bottom of one side of the wireless charging front shell remote from the main body rear shell; a formfeder block is fixedly provided at one side of the main body front shell remote from the wireless charging front shell, slide grooves are formed symmetrically on the main body front shell along a vertical direction, T-shaped slide groove blocks are slidably connected to an inner wall of the slide grooves, the T-shaped slide groove blocks are connected with the wireless charging front shell through bolts, and one of the slide groove blocks defines a wire hole.

As a further description of the above technical solution, the wireless charging front shell includes a charging area; a wireless charging coil is arranged on a side of the wireless charging front shell close to the wireless charging bottom shell, a position of the wireless charging coil is corresponding to the charging area, one end of the wireless charging coil is connected with the charging area, the other end of the wireless charging coil is passing through a through hole and being connected with the wireless charging PCB.

As a further description of the above technical solution, a clamping block is welded on a side of the T-shaped slide groove block remote from the main body front shell. A formfeder is fixed on an outer wall of the clamping block at one end of the formfeder. Another end of the formfeder is fixedly connected with the formfeder block. The clamping block is configured to fix the formfeder block.

As a further description of the above technical solution, a power wire is fixedly provided at one side of the main body rear shell remote from the main body front shell. One end of the power wire is extending into the main body rear shell and is fixedly connected with a protection assembly. Another end of the power wire is extending into the main body rear shell and is externally sleeved with a clamp. The clamp and the main body rear shell are fixed by bolts, and the clamp is configured to fix the power wire.

As a further description of the above technical solution, two groups of USB interfaces and Type-C interfaces are provided at the top of the main body rear shell; an indicator lamp is fixedly provided at a side of the Type-C interfaces remote from the USB interfaces on top of the main body rear shell; national standard five sockets are provided at both sides of the main body rear shell.

As a further description of the above technical solution, a placing plate is fixedly provided at bottom of one side of the wireless charging front shell (1) remote from the main body rear shell (12); a formfeder block (7) is fixedly provided at one side of the main body front shell remote from the wireless charging front shell (1), slide grooves are formed symmetrically on the main body front shell along a vertical direction, T-shaped slide groove blocks (5) are slidably connected to an inner wall of the slide grooves, the T-shaped slide groove blocks (5) being connected with the wireless charging front shell (1) through bolts, and one of the slide groove blocks defines a wire hole. and the wireless charging front shell (1) comprises a charging area; a wireless charging coil (2) is arranged on a side of the wireless charging front shell (1) close to the wireless charging bottom shell (3), a position of the wireless charging coil (2) corresponding to the charging area, one end of the wireless charging coil (2)

being connected with the charging area, the other end of the wireless charging coil (2) passing through a through hole and being connected with the wireless charging PCB (8).

As a further description of the above technical solution, a power wire (13) is fixedly provided at one side of the main body rear shell (12) remote from the main body front shell (4). One end of the power wire (13) is extending into the main body rear shell (12) and is fixedly connected with a protection assembly (9). Another end of the power wire (13) is extending into the main body rear shell (12) and is externally sleeved with a clamp (11). The clamp (11) and the main body rear shell (12) are fixed by bolts. And two groups of USB interfaces and Type-C interfaces are provided at the top of the main body rear shell (12); an indicator lamp is fixed on top of the main body rear shell (12) adjacent to the Type-C interfaces and remote from the USB interfaces; national standard five sockets are provided at both sides of the main body rear shell (12).

The present disclosure has the following practical effects:

1. In the present disclosure, when a user would like to place the cell phone vertically for operation, the wireless charging shell can be pushed to move upwards, moving the wireless charging bottom shell upwards as well as the two groups of T-shaped slide groove blocks to move upwards. The formfeder is deformed, one end of which is fixed on the front shell of the main body through the pressing block of the formfeder. When the T-shaped slide groove block passes over the middle point of the chute on the front shell of the main body, the formfeder resets and provides an upward force which may move the two groups of T-shaped slide groove blocks upwards. The top ends of the T-shaped slide groove blocks are abutted against the inner wall of the top of the slide groove, i.e. the charging area on the wireless charging front shell moves upward to the end point. And at this time, the mobile phone can be placed on the placing plate at the bottom of the front shell of the main body vertically for charging and can be operated. Through deformation of the formfeder, fixing one end of the formfeder with the front shell of the main body by the formfeder block, fixing the other end of the formfeder by the T-shaped slide groove block, and fixing the T-shaped slide groove block with the wireless charging shell, the charging device can charging the mobile phone in his horizontal and vertical placement of during wireless charging, improving the practicability of wireless charging and providing convenience for operation.

2. In the present disclosure, a group of Type-C interfaces and two groups of USB interfaces are arranged on the top of the rear shell of the main body. And national standard five sockets are arranged on both sides of the main body rear shell, so that the charging device is also suitable to charge with wires when wireless charging is not performed. Charging becomes convenient with improved practicability, and multifunction of the device is realized.

DESCRIPTION OF REFERENCE NUMERALS

Figure 1:
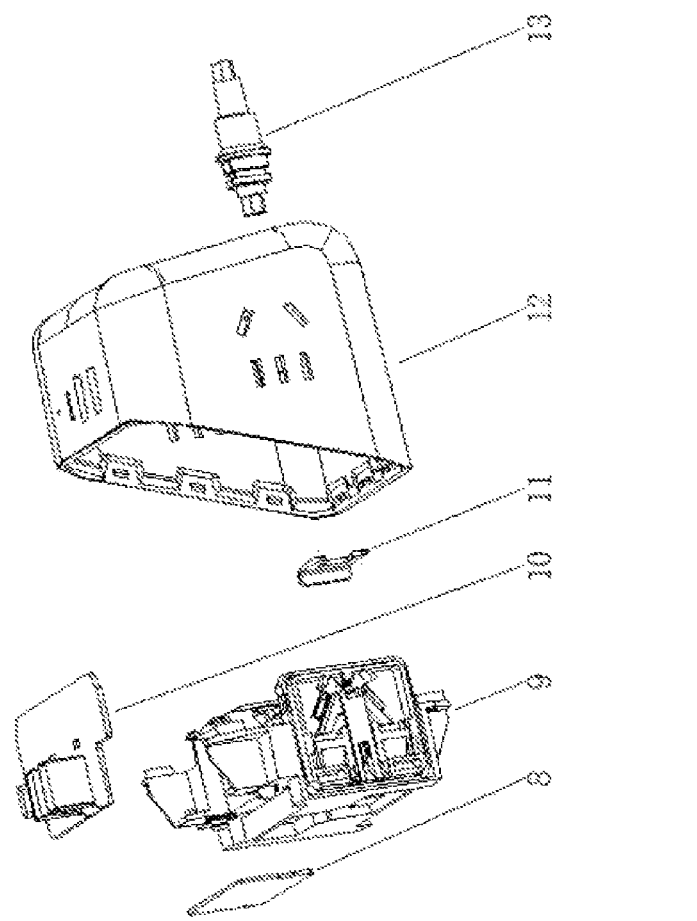
FIG. 1 is a schematic structural diagram of a multi-functional smart wireless charging device for cell phone in horizontal placement and vertical placement according to the present disclosure.
Figure 1:
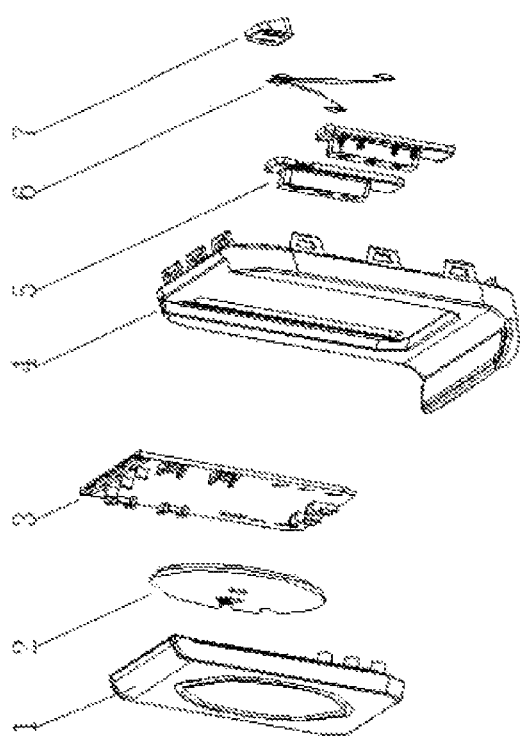

1—front shell of wireless charger, 2—coil of wireless charger, 3—bottom shell of wireless charger, 4—front shell of main body, 5—T-shaped slide groove block, 6—formfeder spring, 7—block for formfeder, 8—PCB of wireless charger, 9—protection assembly, 10—main PCB, 11—wire clamp, 12—rear shell of main body, 13—power wire.

DETAILED DESCRIPTION OF THE EMBODIMENTS

As following, the technical solution in the embodiments of the present disclosure will be described clearly and completely with reference to the drawings in the embodiment of the present application. Obviously, the described embodiment is only a part of the embodiment of the present disclosure, not all of the embodiments. Based on the embodiments in the present application, all other embodiments perceived by those ordinary skills in the art without creative effort should be fallen within the protection scope of the present application.

In the description of the present disclosure, it should be appreciated that the orientation or positional relationship indicated by the terms "center", "upper", "lower", "left", "right", "vertical", "horizontal", "inner" and "outer" are based on the orientation or positional relationship shown in the drawings, which is only for convenience and simplification of description of embodiments of the present disclosure, and do not indicate or imply that the indicated device or element must have a specific orientation, or be constructed and operate in a specific orientation. Therefore such terms cannot be understood as a limitation to the present disclosure. The terms "first", "second" and "third" are used for descriptive purposes only and are not to be understood as indicating or implying relative importance. In addition, the terms "installed", "communicated" and "connected" should be understood in a broad sense unless otherwise specified and defined. For example, such arrangement can be fixed connection, detachable connection or integrated connection. It can also be mechanical connection or electrical connection. It can be directly connected or indirectly connected through an intermediate medium, and it can be the internal communication of two components. For those ordinary skilled in the art, the specific meanings of the aforementioned terms in the present disclosure can be understood according to practical conditions.

Referring to FIGS. 1-5, the present disclosure proposes a multi-functional smart wireless charging device for cell phone in horizontal placement and vertical placement, the device includes a hollow main body rear shell 12. A protection assembly 9 is fixedly provided in the main body rear shell 12. A main PCB 10 is provided on top of the protection assembly 9. One side of the PCB is abutted with a wireless charging PCB 8 fixedly provided on top of the protection assembly 9. The wireless charging PCB 8 is connected with a main body front shell 4 on one side of the wireless charging PCB 8 remote from the main PCB 10. The main body front shell 4 and the main body rear shell 12 are fixedly provided by bolts. A wireless charging bottom shell 3 is slidably connected on one side of the main body front shell 4 remote from the main body rear shell 12. And a wireless charging front shell 1 is installed on one side of the wireless charging bottom shell 3 remote from the main body front shell 4, forming the wireless charging device.

Figure 5:
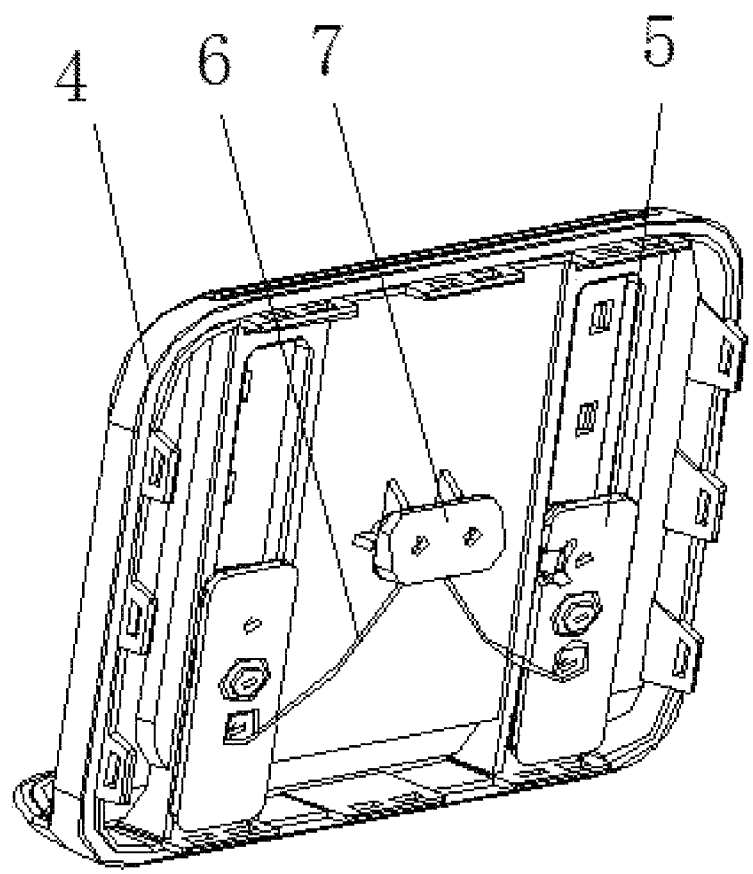
FIG. 5 is a schematic structural diagram regarding a formfeder of a multi-functional smart wireless charging device for cell phone in horizontal placement and vertical placement according to the present disclosure.

Referring to FIGS. 1 and 5, in the present disclosure, a placing plate is fixedly provided at bottom of one side of the wireless charging front shell 1 remote from the main body rear shell 12; a formfeder block 7 is fixedly provided at one side of the main body front shell remote from the wireless charging front shell 1, slide grooves are formed symmetrically on the main body front shell along a vertical direction, T-shaped slide groove blocks 5 are slidably connected to an inner wall of the slide grooves, the T-shaped slide groove blocks 5 being connected with the wireless charging front shell 1 through bolts, and one of the slide groove blocks defines a wire hole. The wire hole is configured for the wireless charging coil 2 to pass through, and the placing plate is configured for the mobile phone to place. The formfeder block 7 is configured to fix the formfeder to the main body rear shell 4.

Referring to FIGS. 1 and 5, in the present disclosure, the wireless charging front shell 1 includes a charging area. A wireless charging coil 2 is arranged on a side of the wireless charging front shell 1 close to the wireless charging bottom shell 3, and a position of the wireless charging coil 2 is correspondent to a position of the charging area. One end of the wireless charging coil 2 is connected with the charging area, and the other end of the wireless charging coil 2 passes through a through hole and is connected with the wireless charging PCB 8.

Referring to FIG. 5, in the present disclosure, a clamping block is welded on a side of the T-shaped slide groove block 5 remote from the main body front shell 4. A formfeder 6 is fixed on an outer wall of the clamping block at one end of the formfeder. Another end of the formfeder 6 is fixedly connected with the formfeder block 7. The clamping block is configured to fix the formfeder block 7.

Referring to FIG. 1, in the present disclosure, a power wire 13 is fixedly provided at one side of the main body rear shell 12 remote from the main body front shell 4. One end of the power wire 13 is extending into the main body rear shell 12 and is fixedly connected with a protection assembly 9. Another end of the power wire 13 is extending into the main body rear shell 12 and is externally sleeved with a clamp 11. The clamp 11 and the main body rear shell 12 are fixed by bolts, and the clamp 11 is configured to fix the power wire 13.

Figure 2:
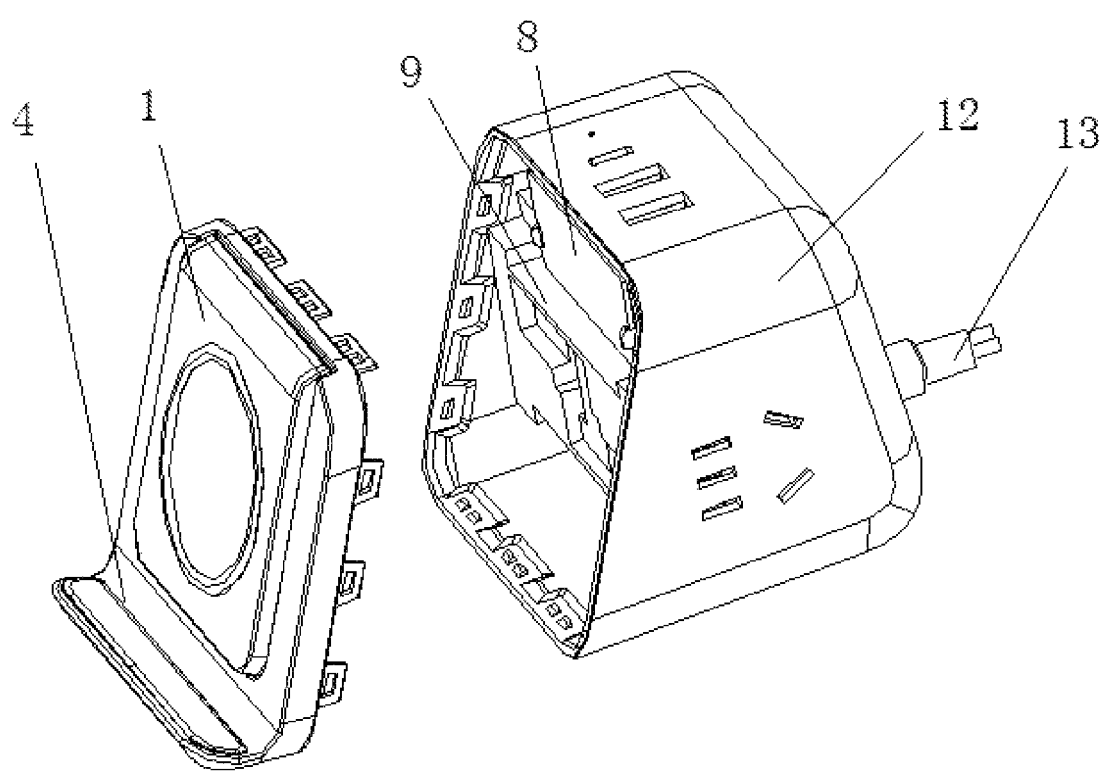
FIG. 2 is a schematic diagram regarding the installation of a main body front shell and a main body rear shell of a multi-functional smart wireless charging device for cell phone in horizontal placement and vertical placement according to the present disclosure.
Figure 3:
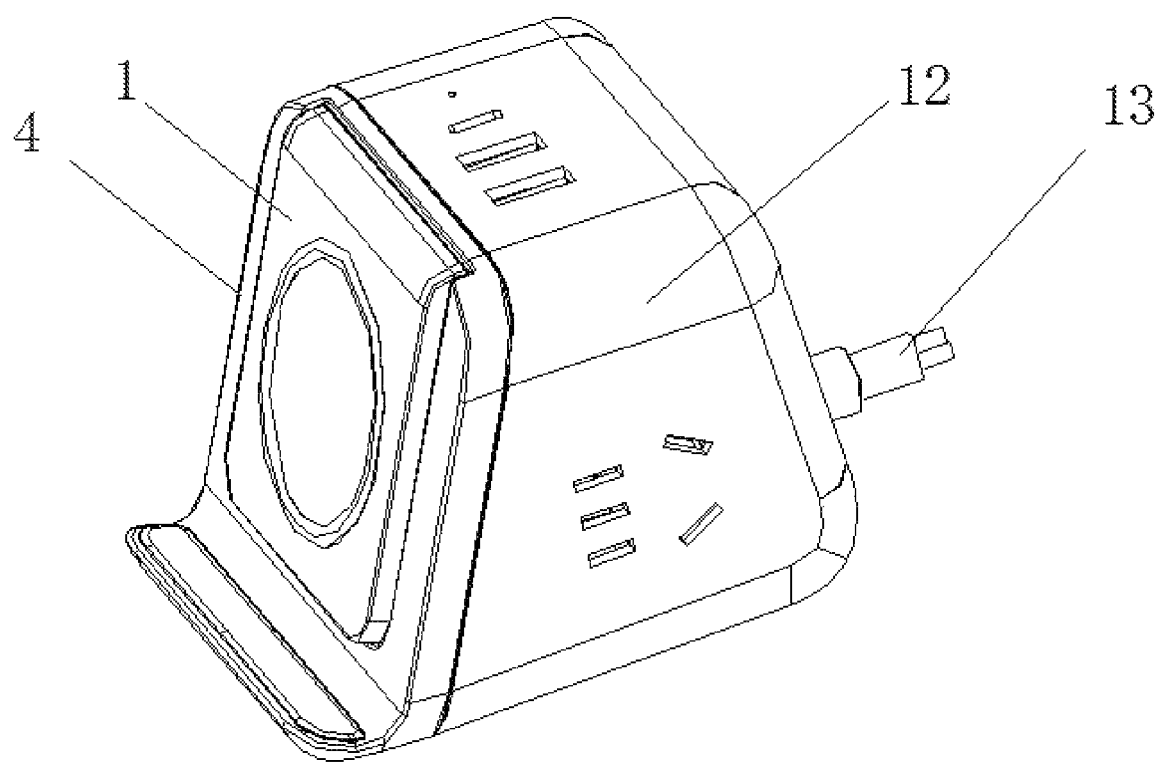
FIG. 3 is a schematic view of a multi-functional smart wireless charging device for cell phone in horizontal placement and vertical placement according to the present disclosure, when the mobile phone is in the horizontal placement.
Figure 4:
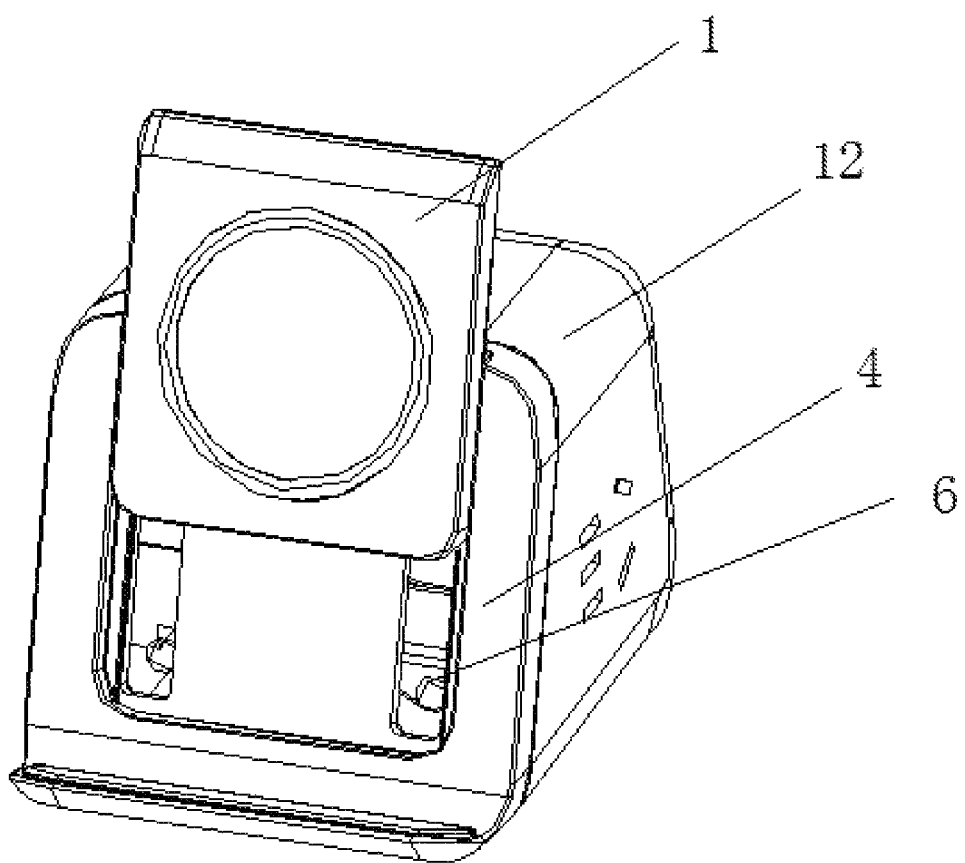
FIG. 4 is a schematic view of a multi-functional smart wireless charging device for cell phone in horizontal placement and vertical placement according to the present disclosure, when the mobile phone is in the vertical placement.

Referring to FIGS. 1-3, in the present disclosure, two groups of USB interfaces and Type-C interfaces are arranged on the top of the main body rear shell 12, and an indicator lamp is fixedly provided on the top of the main body rear shell 12 is arranged on one side of the Type-C interfaces remote from the USB interfaces on top of the main body rear shell 12. National standard five sockets are arranged on both sides of the main body rear shell 12, so that the mobile phone can be charged by wires when wireless charging is not applicable. The practicability of a wireless charging device for cell phone in horizontal placement and vertical placement is improved.

Referring to FIGS. 1 and 5, in the present disclosure, a placing plate is fixedly provided at bottom of one side of the wireless charging front shell (1) remote from the main body rear shell (12); a formfeder block (7) is fixedly provided at one side of the main body front shell remote from the wireless charging front shell (1), slide grooves are formed symmetrically on the main body front shell along a vertical direction, T-shaped slide groove blocks (5) are slidably connected to an inner wall of the slide grooves, the T-shaped slide groove blocks (5) being connected with the wireless charging front shell (1) through bolts, and one of the slide groove blocks defines a wire hole. And the wireless charging front shell 1 includes a charging area. A wireless charging coil 2 is arranged on a side of the wireless charging front shell 1 close to the wireless charging bottom shell 3, and a position of the wireless charging coil 2 is correspondent to a position of the charging area. One end of the wireless charging coil 2 is connected with the charging area, and the other end of the wireless charging coil 2 passes through a through hole and is connected with the wireless charging PCB 8.

Referring to FIGS. 1 to 3, in the present disclosure, a power wire (13) is fixedly provided at one side of the main body rear shell (12) remote from the main body front shell (4). One end of the power wire (13) is extending into the main body rear shell (12) and is fixedly connected with a protection assembly (9). Another end of the power wire (13) is extending into the main body rear shell (12) and is externally sleeved with a clamp (11). The clamp (11) and the main body rear shell (12) are fixed by bolts, and the clamp (11) is configured to fix the power wire (13). And two groups of USB interfaces and Type-C interfaces are arranged on the top of the main body rear shell 12, and an indicator lamp is fixedly provided on the top of the main body rear shell 12 is arranged on one side of the Type-C interfaces remote from the USB interfaces on top of the main body rear shell 12. National standard five sockets are arranged on both sides of the main body rear shell 12, so that the mobile phone can be charged by wires when wireless charging is not applicable. The practicability of a wireless charging device for cell phone in horizontal placement and vertical placement is improved.

Working Principle:

In the present disclosure, when in use, the mobile phone to be charged is placed on the placing plate at the bottom of the main body front shell 4. The power wire 13 transmits current to the charging area on the wireless charging front shell 1 through the wireless charging PCB and the wireless charging coil 2 to charge the mobile phone. In the initial state, the mobile phone is placed horizontally. when a user would like to place the cell phone vertically for operation, the wireless charging shell can be pushed to move upwards, moving the wireless charging bottom shell upwards as well as the two groups of T-shaped slide groove blocks to move upwards. The formfeder is deformed, one end of which is fixed on the front shell of the main body through the pressing block of the formfeder. When the T-shaped slide groove block passes over the middle point of the chute on the front shell of the main body, the formfeder resets and provides an upward force which may move the two groups of T-shaped slide groove blocks upwards. The top ends of the T-shaped slide groove blocks are abutted against the inner wall of the top of the slide groove, i.e. the charging area on the wireless charging front shell moves upward to the end point. And at this time, the mobile phone can be placed on the placing plate at the bottom of the front shell of the main body vertically for charging and can be operated. Through deformation of the formfeder, fixing one end of the formfeder with the front shell of the main body by the formfeder pressing block, fixing the other end of the formfeder by the T-shaped slide groove block, and fixing the T-shaped slide groove block with the wireless charging shell, the charging device can charging the mobile phone in his horizontal and vertical placement of during wireless charging, improving the practicability of wireless charging and providing convenience for operation.

In the present disclosure, a group of Type-C interfaces and two groups of USB interfaces are arranged on the top of the rear shell of the main body. And national standard five sockets are arranged on both sides of the main body rear shell, so that the charging device is also suitable to charge with wires when wireless charging is not performed. Charging becomes convenient with improved practicability, and multifunction of the device is realized.

Finally, it should be appreciated that the above description is only some of embodiment of the present disclosure, and is thus not intended to limit the present disclosure. Although the present disclosure has been described in detail with reference to the above-mentioned embodiments, it is still possible for those skilled in the art to modify the technical solution recorded in the above-mentioned embodiments or to substitute some of its technical features equally. Any modification, equivalent substitution, improvement made within the spirit and principles of the present disclosure shall be included in the scope of the present disclosure.

What is claimed is:

1. A multi-functional smart wireless charging device for cell phone in horizontal placement and vertical placement, comprising a hollow main body rear shell (12), wherein
    a protection assembly (9) is fixedly provided in the main body rear shell (12);
    a main PCB (10) is provided on top of the protection assembly (9), one side of the PCB being abutted with a wireless charging PCB (8) fixedly provided on top of the protection assembly (9), wherein
        the wireless charging PCB (8) is connected with a main body front shell (4) on one side of the wireless charging PCB (8) remote from the main PCB (10);
    the main body front shell (4) and the main body rear shell (12) are fixedly provided by bolt; a wireless charging bottom shell (3) is slidably connected on one side of the main body front shell (4) remote from the main body rear shell (12); and
    a wireless charging front shell (1) is installed on one side of the wireless charging bottom shell (3) remote from the main body front shell (4).

2. The multi-functional smart wireless charging device according to claim 1, wherein
    a placing plate is fixedly provided at bottom of one side of the wireless charging front shell (1) remote from the main body rear shell (12);
    a formfeder block (7) is fixedly provided at one side of the main body front shell remote from the wireless charging front shell (1);
    slide grooves are formed symmetrically on the main body front shell along a vertical direction,
    T-shaped slide groove blocks (5) are slidably connected to an inner wall of the slide grooves, the T-shaped slide groove blocks (5) being connected with the wireless charging front shell (1) through bolts, and
    one of the slide groove blocks defines a wire hole.

3. The multi-functional smart wireless charging device according to claim 1, wherein
    the wireless charging front shell (1) comprises a charging area;
    a wireless charging coil (2) is arranged on a side of the wireless charging front shell (1) close to the wireless charging bottom shell (3),
        a position of the wireless charging coil (2) corresponding to the charging area,
        one end of the wireless charging coil (2) being connected with the charging area,
        the other end of the wireless charging coil (2) passing through a through hole and being connected with the wireless charging PCB (8).

4. The multi-functional smart wireless charging device according to claim 2, wherein
    a clamping block is welded on a side of the T-shaped slide groove block (5) remote from the main body front shell (4);
    a formfeder (6) is fixed on an outer wall of the clamping block at one end of the formfeder, another end of the formfeder (6) being fixedly connected with the formfeder block (7).

5. The multi-functional smart wireless charging device according to claim 1, wherein
    a power wire (13) is fixedly provided at one side of the main body rear shell (12) remote from the main body front shell (4),
        one end of the power wire (13) extending into the main body rear shell (12) and being fixedly connected with a protection assembly (9),
        another end of the power wire (13) extending into the main body rear shell (12) and being externally sleeved with a clamp (11), wherein
        the clamp (11) and the main body rear shell (12) are fixed by bolt.

6. The multi-functional smart wireless charging device according to claim 1, wherein
    two groups of USB interfaces and Type-C interfaces are provided at the top of the main body rear shell (12);
    an indicator lamp is fixed on top of the main body rear shell (12) adjacent to the Type-C interfaces and remote from the USB interfaces;
    national standard five sockets are provided at both sides of the main body rear shell (12).

7. The multi-functional smart wireless charging device according to claim 1, wherein
    a placing plate is fixedly provided at bottom of one side of the wireless charging front shell (1) remote from the main body rear shell (12);
    a formfeder block (7) is fixedly provided at one side of the main body front shell remote from the wireless charging front shell (1),
    slide grooves are formed symmetrically on the main body front shell along a vertical direction,
    T-shaped slide groove blocks (5) are slidably connected to an inner wall of the slide grooves,
        the T-shaped slide groove blocks (5) being connected with the wireless charging front shell (1) through bolts, and
    one of the slide groove blocks defines a wire hole; and
    the wireless charging front shell (1) comprises a charging area;
    a wireless charging coil (2) is arranged on a side of the wireless charging front shell (1) close to the wireless charging bottom shell (3), a position of the wireless charging coil (2) corresponding to the charging area,
one end of the wireless charging coil (2) being connected with the charging area,
the other end of the wireless charging coil (2) passing through a through hole and being connected with the wireless charging PCB (8).

8. The multi-functional smart wireless charging device according to claim 1, wherein
a power wire (13) is fixedly provided at one side of the main body rear shell (12) remote from the main body front shell (4),
one end of the power wire (13) extending into the main body rear shell (12) and being fixedly connected with a protection assembly (9),
another end of the power wire (13) extending into the main body rear shell (12) and being externally sleeved with a clamp (11), wherein
the clamp (11) and the main body rear shell (12) are fixed by a bolt; and
two groups of USB interfaces and Type-C interfaces are provided at the top of the main body rear shell (12);
an indicator lamp is fixedly provided at a side of the Type-C interfaces remote from the USB interfaces on top of the main body rear shell (12);
national standard five sockets are provided at both sides of the main body rear shell (12).

9. A multi-functional smart wireless charging component for cell phone in horizontal placement and vertical placement, comprising a hollow main body rear shell (12), wherein
a protection assembly (9) is fixedly provided in the main body rear shell (12);
a main PCB (10) is provided on top of the protection assembly (9),
one side of the PCB being abutted with a wireless charging PCB (8) fixedly provided on top of the protection assembly (9), wherein
the wireless charging PCB (8) is connected with a main body front shell (4) on one side of the wireless charging PCB (8) remote from the main PCB (10);
the main body front shell (4) and the main body rear shell (12) are fixedly provided by a bolt;
a wireless charging bottom shell (3) is slidably connected on one side of the main body front shell (4) remote from the main body rear shell (12); and
a wireless charging front shell (1) is installed on one side of the wireless charging bottom shell (3) remote from the main body front shell (4).

10. The multi-functional smart wireless charging component according to claim 9, wherein
a placing plate is fixedly provided at bottom of one side of the wireless charging front shell (1) remote from the main body rear shell (12);
a formfeder block (7) is fixedly provided at one side of the main body front shell remote from the wireless charging front shell (1);
slide grooves are formed symmetrically on the main body front shell along a vertical direction;
T-shaped slide groove blocks (5) are slidably connected to an inner wall of the slide grooves, the T-shaped slide groove blocks (5) being connected with the wireless charging front shell (1) through bolts, and
U-one of the slide groove blocks defines a wire hole.

11. The multi-functional smart wireless charging component according to claim 9, wherein
the wireless charging front shell (1) comprises a charging area;
a wireless charging coil (2) is arranged on a side of the wireless charging front shell (1) close to the wireless charging bottom shell (3),
a position of the wireless charging coil (2) corresponding to the charging area, one end of the wireless charging coil (2) being connected with the charging area,
the other end of the wireless charging coil (2) passing through a through hole and being connected with the wireless charging PCB (8).

12. The multi-functional smart wireless charging component according to claim 10, wherein
a clamping block is welded on a side of the T-shaped slide groove block (5) remote from the main body front shell (4);
a formfeder (6) is fixed on an outer wall of the clamping block at one end of the formfeder, another end of the formfeder (6) being fixedly connected with the formfeder block (7).

13. The multi-functional smart wireless charging component according to claim 9, wherein
a power wire (13) is fixedly provided at one side of the main body rear shell (12) remote from the main body front shell (4),
one end of the power wire (13) extending into the main body rear shell (12) and being fixedly connected with a protection assembly (9),
another end of the power wire (13) extending into the main body rear shell (12) and being externally sleeved with a clamp (11), wherein
the clamp (11) and the main body rear shell (12) are fixed by bolts.

14. The multi-functional smart wireless charging component according to claim 9, wherein
two groups of USB interfaces and Type-C interfaces are provided at the top of the main body rear shell (12);
an indicator lamp is fixedly provided at a side of the Type-C interfaces remote from the USB interfaces on top of the main body rear shell (12);
national standard five sockets are provided at both sides of the main body rear shell (12).

15. A housing for cell phone in horizontal placement and vertical placement, comprising a hollow main body rear shell (12), wherein
a protection assembly (9) is fixedly provided in the main body rear shell (12);
a main PCB (10) is provided on top of the protection assembly (9),
one side of the PCB being abutted with a wireless charging PCB (8) fixedly provided on top of the protection assembly (9), wherein
the wireless charging PCB (8) is connected with a main body front shell (4) on one side of the wireless charging PCB (8) remote from the main PCB (10);
the main body front shell (4) and the main body rear shell (12) are fixedly provided by a bolt;
a wireless charging bottom shell (3) is slidably connected on one side of the main body front shell (4) remote from the main body rear shell (12); and
a wireless charging front shell (1) is installed on one side of the wireless charging bottom shell (3) remote from the main body front shell (4).

16. The housing according to claim 15, wherein
a placing plate is fixedly provided at bottom of one side of the wireless charging front shell (1) remote from the main body rear shell (12);
a formfeder block (7) is fixedly provided at one side of the main body front shell remote from the wireless charging front shell (1);
slide grooves are formed symmetrically on the main body front shell along a vertical direction;
T-shaped slide groove blocks (5) are slidably connected to an inner wall of the slide grooves, the T-shaped slide groove blocks (5) being connected with the wireless charging front shell (1) through bolts, and
one of the slide groove blocks defines a wire hole.

17. The housing according to claim 15, wherein
the wireless charging front shell (1) comprises a charging area;
a wireless charging coil (2) is arranged on a side of the wireless charging front shell (1) close to the wireless charging bottom shell (3),
a position of the wireless charging coil (2) corresponding to the charging area,
one end of the wireless charging coil (2) being connected with the charging area,
the other end of the wireless charging coil (2) passing through a through hole and being connected with the wireless charging PCB (8).

18. The housing according to claim 16, wherein
a clamping block is welded on a side of the T-shaped slide groove block (5) remote from the main body front shell (4);
a formfeder (6) is fixed on an outer wall of the clamping block at one end of the formfeder, another end of the formfeder (6) being fixedly connected with the formfeder block (7).

19. The housing according to claim 15, wherein
a power wire (13) is fixedly provided at one side of the main body rear shell (12) remote from the main body front shell (4),
one end of the power wire (13) extending into the main body rear shell (12) and being fixedly connected with a protection assembly (9),
another end of the power wire (13) extending into the main body rear shell (12) and being externally sleeved with a clamp (11), wherein
the clamp (11) and the main body rear shell (12) are fixed by bolts.

20. The housing according to claim 15, wherein
two groups of USB interfaces and Type-C interfaces are provided at the top of the main body rear shell (12);
an indicator lamp is fixedly provided at a side of the Type-C interfaces remote from the USB interfaces on top of the main body rear shell (12);
national standard five sockets are provided at both sides of the main body rear shell (12).

* * * * *